Sept. 13, 1960 W. C. FREHSE 2,952,053
SEALING STRIP FOR CLOSURES
Filed March 10, 1958

INVENTOR
Walter C. Frehse
BY McCoy, Greene + ......
ATTORNEYS

United States Patent Office 2,952,053
Patented Sept. 13, 1960

2,952,053

SEALING STRIP FOR CLOSURES

Walter C. Frehse, Wabash, Ind., assignor to The General Tire & Rubber Company, Akron, Ohio, a corporation of Ohio Filed Mar. 10, 1958, Ser. No. 720,164

2 Claims. (Cl. 20—69)

This invention relates to sealing strips for sealing the space between the margin of an opening and the door, lid or other closure for it.

The sealing strip is shown applied to a seal for the trunk lid of a motor vehicle and is in the form of an elongated strip of elastic rubber-like material that is of uniform cross section throughout its length and that is provided with a flexible base that can be forced into a retaining channel of less width than the base.

The sealing strip also has a tubular, collapsible bead that overlies the base and that is joined to the base by a short upright integral web. The collapsible bead is of generally round cross section and is of a width to overlie the major portion of the base. The web is positioned near one edge of the base and the portion of the base between the web and the opposite edge of the base is relatively thin and flexible, providing a base flange that is bendable to enable the strip to be positioned in a channel narrower than the strip.

The collapsible bead is offset laterally with respect to the center plane of the connecting web on the side thereof from which the base flange projects so as to position the major portion of the hollow bead directly over the base flange. The wall of the hollow collapsible bead is weakened by a longitudinal internal groove adjacent the web on the side thereof toward which the bead is offset to provide a bend line which increases the flexure of the wall at the side of the web on which the groove is located, so that the bead will be pressed laterally against a wall surface to seal the space between that surface and the margin of the closure member when the bead is compressed by the closure member.

Objects of the invention are to provide a sealing strip of simple construction that can be readily formed by the extrusion process, that can be easily installed, that is readily removable for replacement, and that can be bent around corners without excessive distortion.

Reference should be had to the accompanying drawings forming a part of this invention, in which.

Figure 1:
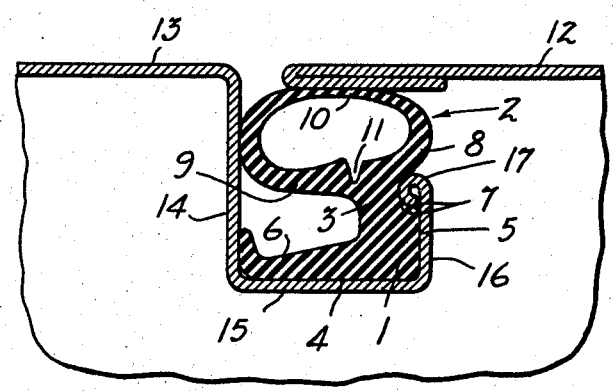
Figure 1 is a fragmentary cross sectional view showing the sealing strip of the present invention employed to seal around the opening of an automobile trunk compartment.
Figure 3:
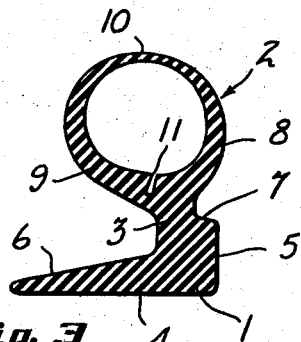
Fig. 3 is a transverse section through the sealing strip.
Figure 2:
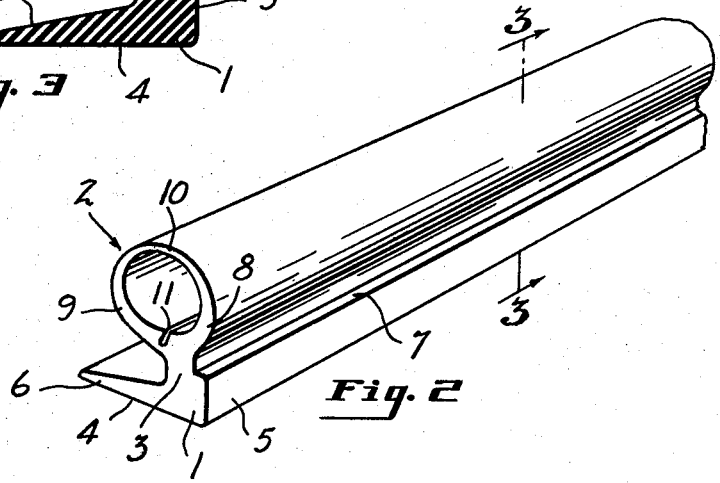
Fig. 2 is a perspective view of the sealing strip.

As shown in the accompanying drawings, the sealing strip of the present invention which is of uniform cross sectional shape throughout its length, has a base 1, a hollow collapsible longitudinal bead 2 of a width to overlie the major portion of the base, and a short upright longitudinal connecting web 3 integral with the base and bead. The base 1 has a flat bottom 4 and a flat side edge 5. The web 3 is located adjacent the edge 5 and the portion of the base between the web 3 and the opposite edge of the base 1 is relatively thin and flexible. As herein shown, this portion of the base decreases in thickness from the web 3 to the edge of the base to provide a flexible flange 6. The web 3 is inset a short distance from the edge 5 of the strip to provide a retaining shoulder 7.

The hollow bead 2 is generally round in cross section and is positioned with its center offset with respect to the center plane of the web 3 to position the major portion of the bead over the flange 6. The wall of the tubular bead gradually decreases in thickness upwardly from the web 3, providing a steeply inclined relatively thick portion 8 extending upwardly from the web and overlying the shoulder 7 and a longer less steeply inclined relatively thick portion 9 on the opposite side of the web and overlying the flange 6. The top portion 10 of the bead wall is relatively thin and flexible. The portion 9 of the tube wall is weakened adjacent the web 3 by an internal longitudinal groove 11 which provides a bend line about which the wall portion 9 can pivot when the bead is collapsed by pressure applied to the top portion 10 of the tube. The pivoting of the wall portion 9 causes the bead to bow toward the edge of the flange 6 to a greater extent than it bows in the opposite direction when pressure is applied to the top portion 10 thereof.

As shown in Fig. 1 of the drawings, the sealing strip of the present invention may be employed to seal the space between the margin of a closure member such as a trunk lid 12 and the margin of the opening in a trunk body 13. A retaining channel for supporting the sealing strip beneath the margin of the lid may be formed in the body 13 by suitable drawing or bending operations. The channel has an outer wall 14 extending inwardly from the exterior of the body 13, a bottom 15 and a short upright flange 16 spaced inwardly from the wall 14 and of less height than the wall 14. At its upper edge the flange 16 may be provided with an inwardly projecting retaining bead 17.

The width of the space between the channel walls 14 and 16 is somewhat less than the width of the base 1 of the sealing strip. The strip may be readily inserted in the channel by reason of the flexibility of the flange 6. When inserted in the channel the shoulder 7 of the base 1 engages beneath the retaining bead 17 and the edge of the flange 6 is bent upwardly and engages with the wall 14.

The bead 2 is normally supported on the flange 16 with its outer edge spaced from the wall 14. When the lid 12 is in closed position it engages the top portion 10 of the collapsible bead 2, forcing the top portion 10 downwardly, flattening the same and exerting a lateral thrust on the wall portions 8 and 9. The downward thrust on the wall portion 9 will cause the same to swing downwardly about a longitudinal axis adjacent the groove 11, causing the bead to be bowed laterally toward the wall 14 to a greater extent than in the opposite direction. Due to the hinge line provided by the groove 11 and to the greater rigidity of the steeply inclined wall portion 8, effective pressure is exerted on the wall 14 by the pressure of the lid on the bead 2.

It is to be understood that in accordance with the provisions of the patent statutes, variations and modifications of the specific devices herein shown and described may be made without departing from the spirit of the invention.

What I claim is:

1. A flexible sealing strip composed of an elastic rubber-like material and of a uniform cross sectional shape throughout its length comprising a base, a hollow tubular bead overlying said base, and a longitudinal upright web interposed between and integral with the bottom portion of the wall of said bead and said base, said web being located adjacent one edge of said base and the portion of said base between its opposite edge and said web being formed to provide a relatively wide and flexible base flange, said bead being of generally externally round cross section and having its center offset with respect to the center plane of said web toward the side of the web from which said flange projects and being of a width to overlie the major portion of said base, said bead having a flexible wall and being collapsible toward said base by pressure applied to the top edge thereof, the bottom portion of said wall that overlies said flange being thicker and less flexible than the top portion thereof and having a longitudinal internal groove adjacent its connection to said web that weakens said wall adjacent said web and creates a line of bend which increases the flexure of said bead toward the edge of said flange when said bead is pressed toward said base.

2. The combination with a retaining channel having one wall provided with an inwardly projecting retaining bead along its top edge and its opposite wall extending above said first mentioned wall, of a sealing strip composed of elastic rubber-like material mounted in said channel, said strip having a base within said channel one side of which engages said one wall, a tubular collapsible bead above said one wall and a web integrally connected to said base and to the bottom portion of said bead, said web being adjacent the edge of said base engaging said one wall of the channel and being spaced inwardly therefrom to provide a shoulder for engagement with said retaining bead, said base being wider than said channel and having a relatively thin and flexible edge portion bent upwardly and engaging said opposite channel wall, said tubular collapsible bead being generally round in cross section and having its center offset with respect to the web and in the direction toward which said flange projects, said bead having an internal longitudinal groove adjacent said web on the side thereof toward said opposite channel wall to weaken the same and provide a line of bend to cause said bead to be collapsed toward and into engagement with said opposite channel wall by pressure toward said base applied along its top edge.

References Cited in the file of this patent

UNITED STATES PATENTS

| | | |
|---|---|---|
| 2,379,193 | Shields | June 26, 1945 |
| 2,622,286 | Beck | Dec. 23, 1952 |
| 2,647,792 | Flemming | Aug. 4, 1953 |

FOREIGN PATENTS

| | | |
|---|---|---|
| 641,145 | Great Britain | Aug. 2, 1950 |
| 765,253 | Great Britan | Jan. 9, 1957 |